United States Patent [19]

Page

[11] Patent Number: 4,885,591
[45] Date of Patent: * Dec. 5, 1989

[54] METHOD AND APPARATUS FOR MONITORING ICE MASSES

[75] Inventor: Ronald D. Page, Newfoundland, Canada

[73] Assignee: Mobil Oil Corp., New York, N.Y.

[*] Notice: The portion of the term of this patent subsequent to Nov. 11, 2003 has been disclaimed.

[21] Appl. No.: 536,800

[22] Filed: Sep. 28, 1983

[51] Int. Cl.$^4$ .......................... G01S 3/02; G01S 13/93
[52] U.S. Cl. .......................... 342/450; 342/8; 342/9; 342/10; 342/41
[58] Field of Search ............ 343/6.8 R, 6.5 SS, 6.5 R; 342/5, 7, 8, 9, 10, 41, 56, 450

[56] References Cited

U.S. PATENT DOCUMENTS

| | | | |
|---|---|---|---|
| 607,229 | 7/1898 | Dyer. | |
| 2,534,710 | 12/1950 | Golian et al. | 342/8 X |
| 2,561,421 | 7/1951 | Seale et al. | 343/6.8 R |
| 2,619,303 | 11/1952 | Martin | 342/10 X |
| 2,646,019 | 7/1953 | Chetlan | 342/10 X |
| 3,130,406 | 4/1964 | Jones-Hinton et al. | 342/8 |
| 3,171,094 | 2/1965 | Geren et al. | 343/6.8 R |
| 3,181,158 | 4/1965 | Feldman | 342/10 |
| 3,449,747 | 6/1969 | Daughenbaugh et al. | 342/8 |
| 3,613,097 | 10/1971 | Daughenbaugh | 342/10 |
| 3,680,645 | 8/1972 | Horbach et al. | 175/16 |
| 3,806,905 | 4/1974 | Strenglein | 343/6.8 RX |
| 3,931,715 | 1/1976 | Fitch et al. | 61/46 |
| 3,961,259 | 6/1976 | Elston et al. | 343/450 |
| 4,104,630 | 8/1978 | Chasek | 343/6.8 R X |
| 4,119,965 | 10/1978 | Kaszyk | 342/8 |
| 4,123,987 | 11/1978 | Singerle et al. | 342/10 X |
| 4,148,033 | 4/1979 | Speckter | 342/7 |
| 4,193,634 | 3/1980 | Nakamura et al. | 299/17 |
| 4,218,680 | 8/1980 | Kennedy | 343/6.8 R |
| 4,223,627 | 9/1980 | Mougin | 114/242 |
| 4,263,595 | 4/1981 | Vogel | 343/6.8 R X |
| 4,334,873 | 6/1982 | Connell | 440/113 |
| 4,621,946 | 11/1986 | Page | 405/61 |
| 4,640,552 | 2/1987 | Page | 299/24 |

*Primary Examiner*—Thomas H. Tarcza
*Assistant Examiner*—John B. Sotomayor
*Attorney, Agent, or Firm*—Alexander J. McKillop; Charles J. Speciale; Stanislaus Aksman

[57] ABSTRACT

A method and apparatus is disclosed for monitoring ice masses wherein a signal transmitter is attached to an ice mass and receivers are used to detect the location of the transmitter.

13 Claims, 7 Drawing Sheets

METHOD AND APPARATUS FOR MONITORING ICE MASSES

BACKGROUND OF THE INVENTION

The present invention pertains to ice handling systems and more particularly to systems where the removal of dangers presented by icebergs to marine platforms or marine vessels located on the open seas.

Presently, icebergs present a constant danger to not only vessels on high seas but also offshore oil rigs or platforms located as far as several hundred miles from the coast.

Icebergs come from glaciers which end at the seashore. A glacier is a moving mass of ice that travels across the land and terminates at the ocean. As the glacier moves to the ocean, portions break off and are termed icebergs. Icebergs are primarily fresh water ice since they are composed of packed ice and snow which has been compressed over hundreds of years. The compression of snow over a large period of time results in a cohesive structure which has small bubbles or pockets of air trapped within.

Icebergs are irregular in shape, each being unique. As an iceberg travels through the ocean, it is constantly melting, at various rates dependent on the temperature of the air and water surrounding the iceberg. As such, the center of gravity will slowly change and the iceberg may roll in the water, presenting further dangers to personnel and equipment working near the iceberg.

Although icebergs are commonly encountered in the North Atlantic from the glaciers in Greenland and Canada, icebergs in smaller quantities are encountered in the Pacific from the Alaskan glaciers. Additionally, large masses of ice are encountered in the Southern Hemisphere from the Coast of Antarctica. These ice masses are similar to the icebergs located in the Northern Hemisphere, although they have a larger surface area and lower height above the water line. Many icebergs will melt at sea and never present a problem, however, many travel towards the equator along the coast line of one of the continents. These icebergs cause dangers to ships when they travel in a shipping lane or to offshore platforms, such as oil rigs, when they travel along the coast.

The danger posed to offshore platforms was not a major concern when the world oil supply was plentiful on land. However, since oil production has moved offshore, particularly in places such as the North Sea or the Hybernia Oil Field off the Coast of Newfoundland, the danger of icebergs has become a significant problem in oil production. An iceberg may weigh as much as a hundred million tons and have a water speed of one half knot. The force with which an iceberg may collide with a platform is devastating.

Under normal conditions, an iceberg watch is kept to monitor iceberg movement. Icebergs which are within one hundred miles of a platform are checked daily to determine whether they pose a danger to a production platform. If the iceberg approaches the platform, a tow line is placed around the iceberg and an attempt is made to maneuver the iceberg to avoid collision with the platform. If the threat of collision cannot be safely avoided, a floating platform may be disconnected from the subsea wellheads and moved out of the path of the iceberg. The disconnection of a production platform may require a loss of a weeks production time. Since the disconnection may require as much as 48 hours, a wide safety margin must be left to assure the prevention of a collision.

The disconnection of a production platform does not remove all detrimental effects of icebergs since flowlines are connected between an onshore storage area and the offshore production platform. Icebergs, because of their specific gravity, float with their majority of their mass beneath the surface o& the water. As such, their draft or depth below the water line, may be several hundred feet. Flowlines may be in only several hundred feet of water and can be damaged or severed by icebergs dragging bottom.

To reduce the draft of an iceberg, many methods have been attempted, such as blasting the iceberg apart. This method has proven unsatisfactory due to the nature of an iceberg. An iceberg is similar to a very densely packed snowball with a great amount of air trapped and compressed within as small air bubbles or pockets of air. The force of an explosive charge is absorbed by the generally deformable structure of the ice.

The method of moving icebergs by placing a tow rope around the peripheral at water level has several disadvantages. First, an iceberg is extremely unstable as it floats in the water and may roll or tip over when towing proceeds. Second, an iceberg generally decreases in size with respect to height out of the water and the tow rope may slide up and over the top of the iceberg.

Other ice masses have similar difficulties in movement by tow ropes circling the ice mass. First, the overall size of the surface area may render the length of the tow line prohibitive. Second, an ice mass having a flat surface and a low height above water may not allow the tow rope to securely rest around the ice mass.

Monitoring icebergs by aircraft iceberg watch has several deficiencies. Aircraft watch or marine vessel watch is weather related. Inclement weather or fog may inhibit aircraft availability. Either inclement weather or fog renders iceberg watch by marine vessel extremely dangerous. As a result, an iceberg may travel for several days while monitoring is impossible. If the iceberg has approached an offshore platform during the inclement weather, conditions may render the detachment and movement of the platform extremely dangerous if not impossible.

SUMMARY OF THE INVENTION

The present invention provides a safe, reliable method and apparatus for monitoring the movement of large masses of ice such as icebergs. A borehole is drilled into an ice mass by a specially designed erosion type water drill. The drill housing having a drillhead at one end and a connection point at the deployment end is configured to contain a cooling system for refreezing the housing when the drill has penetrated the ice mass a predetermined distance. A line is attached to the connection point to secure a floatation member to the ice mass. The floatation member has provision for holding a metallic structure for reflecting electromagnetic waves, such as those used in radar. In an alternate embodiment, a transmitter is secured to the floatation device to transmit electromagnetic signals such as RF (radio frequency) waves. By the use of either, the location of the ice mass may be determined without the requirement of visual contact with the ice mass.

DESCRIPTION OF THE PREFERRED EMBODIMENT

The present invention provides solutions to many ice related problems which create hazzards to not only equipment but also to human life. The use of the present invention removes the requirement of personnel in dangerous situations.

Figure 1:
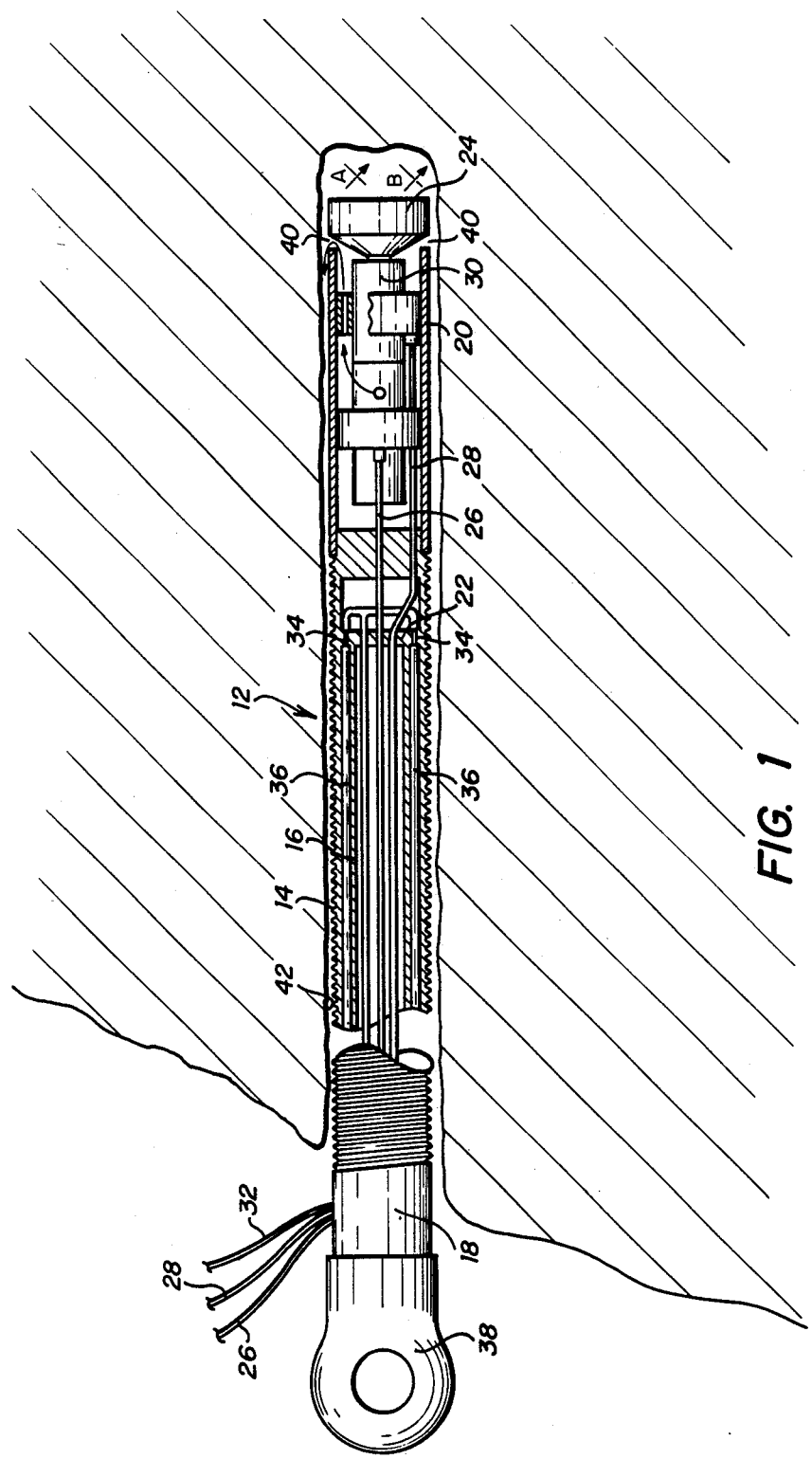
FIG. 1 is a partially sectionalized plan view of an ice drill.

Referring now to FIG. 1, a side sectional view of an ice drill 12 is illustrated in iceberg 13 as having an external housing 14 and an internal concentric housing 16 connected at a deployment end 18 and a drill head end 20 by connectors 22. A rotatably mounted drill head 24 is mounted at drill head end 20 having water lines 26 providing fluid flow to drill head 24 and hydraulic fluid lines 28 to a hydraulic motor 30. The overall length of ice drill 12 is preferably fifteen feet, however, a longer or shorter length may be used with satisfactory results. External housing 14 is preferably steel, chosen for its rigidness and ability to conduct heat. However, any rigid conduit may be used and ability to conduct heat is not required if drill 12 is to be removed when a hole is complete. Under certain conditions ice drill 12 is to be left in the ice mass, drill and the ability of housing 14 to conduct heat is preferred. As such, a metallic conductive material is preferred in the construction of housing 14.

As illustrated in FIG. 1, a fluid refrigerant hose 32 may be added with expansion nozzles 34 connected between hose 32 and an expansion area 36 defined by external housing 14 and internal housing 16. This addition may be used to freeze the drill in place to provide a solid anchor to the ice mass being drilled. Threading 37 may be machined onto external housing 14 to provide greater freezing area. A clevis 38 is provided at deployment end 18 of external housing 14. A tow line (not shown) or the like may be attached to clevis 38.

Drill head 24 has water passages (not shown) angularly drilled therein to provide water streams at angles with face 40 of drill head 24 as indicated by arrows A and B. In operation, high pressure water, or similar liquid, is provided to the passages in drill head 24 through water line 26. The high pressure water has an eroding effect on iceberg 13. Hydraulic motor 30 rotates drill head 24. As hydraulic motor 30 is driven by fluid pressure from fluid line 28, exhaust from hydraulic motor 30 exits through annular opening 40 defined by the space between end 20 of housing 14 and drill head 24. As drill head 24 rotates, water streams A and B travel in a circular path, eroding a borehole 42 in iceberg 13 without grinding or producing tailings to block the efficiency or progress of drill head 24.

In operation ice drill 12 is placed in position at the edge of the ice along the axis of a desired borehole. Pressurized fluid is fed to drill head 24 through water line 26 to provide eroding water streams A and B. A fluid flow is fed to hydraulic motor 30 through fluid line 28 to rotate drill head 24. As water streams A and B rotate with the movement of drill head 24, ice is melted in a generally arcuate area. Melted ice as well as overflow from streams A and B is exhausted with hydraulic fluid from hydraulic motor 30 along the space between outer housing 14 and a borehole 42 provided thereby. Forward motion, that is motion into the iceberg, is exerted on deployment end 18 of external housing 14. This forward motion forces exhaust fluids and melted or eroded ice out of borehole 42.

Whenever ice drill 12 is to be left in iceberg 13 or some other ice mass, inner concentric housing 16 is used to provide expansion area 36.

A compressed fluid such as carbon dioxide may be fed to expansion area 36 through hose 32 to nozzle 34. The compressed fluid expands when leaving nozzle 34 into expansion area 36 causing a significant reduction in temperature. The heat absorbed in the expansion process reduces the surface temperature of external housing 14 causing exhaust fluid from hydraulic motor 30 and drilling head 24 along with melted ice to freeze. Threading 37 provides a greater surface area to extract heat from the fluid between external housing 14 and borehole 42 and also provides a gripping surface once the exhaust fluid is frozen.

As indicated previously, a clevis 38 may be fixed on deployment end 18 of external housing 14 with provision to receive a tow line or cable etc.

Figure 2:
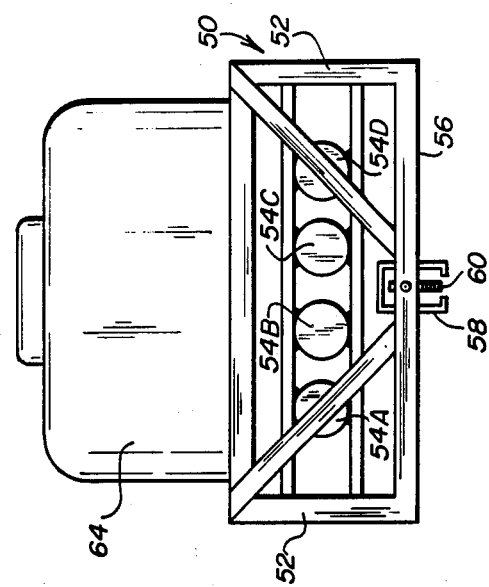
FIG. 2 is a front view of a deployment apparatus.

Referring now to FIG. 2, a front view of a deployment sled 50 is illustrated as having frame members 52 and ballast tanks 54A through 54D. Mounted on a lower support frame 56 is a track 58 and continuous link chain drive 60. Track 58 is adapted for deployment of ice drill 12 and has brackets 62A and 62B (see FIG. 3) to guide ice drill 12 in track 58. Brackets 62A and 62B may be standard brackets attached to chain drive 60 to move drill 12 into iceberg 13 as borehole 42 is drilled. As ice drill 12 advances, bracket 62A releases and drill 12 is supported by borehole 42 and bracket 62B.

Illustrated in phantom above deployment sled 50 is a remotely operated vehicle 64. Remotely operated vehicle 64 may be of any type currently used in the art, the only requirement being that it may be adapted to grip onto deployment sled 50 without greatly restricting its maneuverability.

Figure 3:
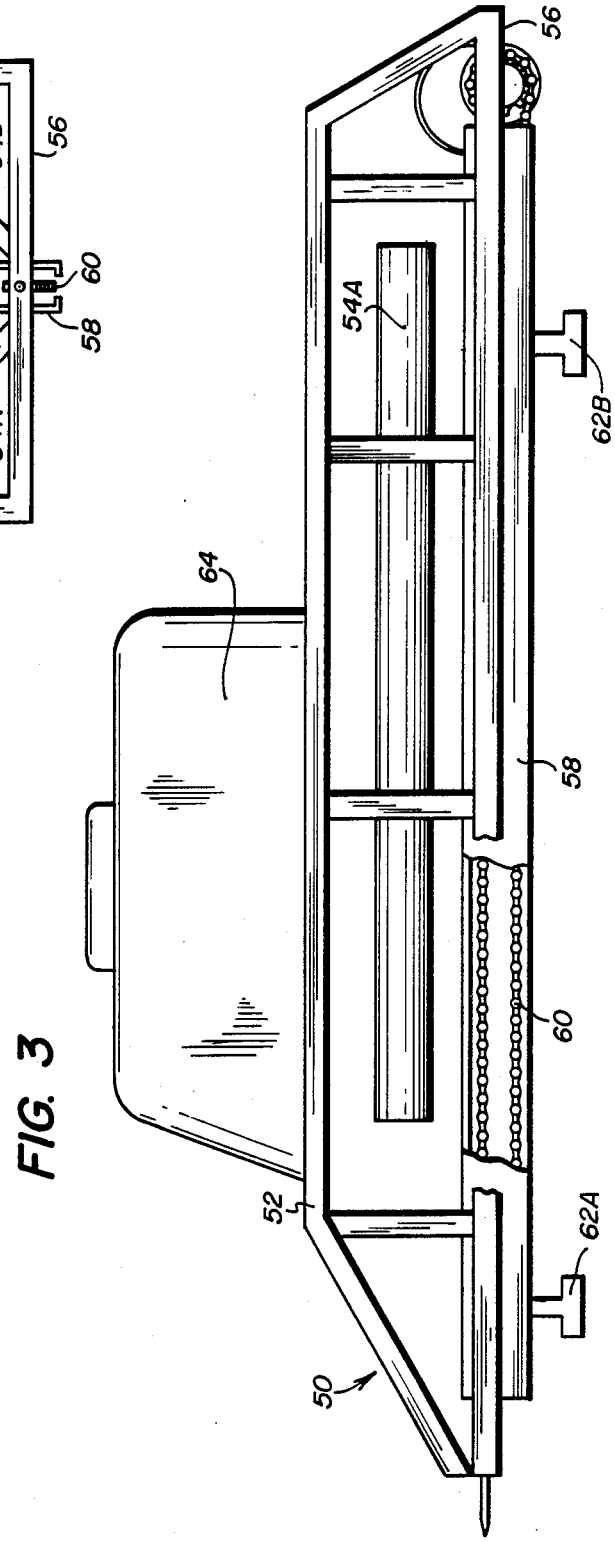
FIG. 3 is a side view of FIG. 2.

Referring now to FIG. 3, side view of the deployment sled of FIG. 2 illustrates ballast tanks 54A through 54D as running the full length of deployment sled 50. As ice drill 12 is deployed into the ice mass or iceberg which is being drilled, the weight of the deployment system comprising remotely operated vehicle 64 and deployment sled 50 is reduced in weight. To prevent dipping or pitching of deployment sled 50, ballast is released to maintain a predetermined bouyancy and to assure the deployment of ice drill 12 on a generally horizontal plane. Ballast release may be controlled electrically by a gyroscope (not shown) or the like. Ballast is released automatically when the pitch or slope of deployment sled 50 exceeds a predetermined amount.

Figure 4A:
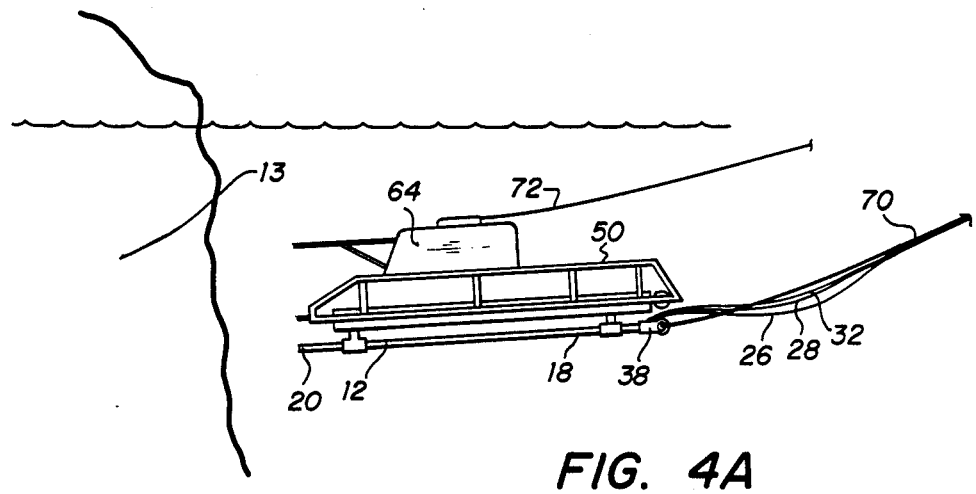
FIGS. 4A through 4C are plan views of the deployment of an ice anchoring device.
Figure 4B:
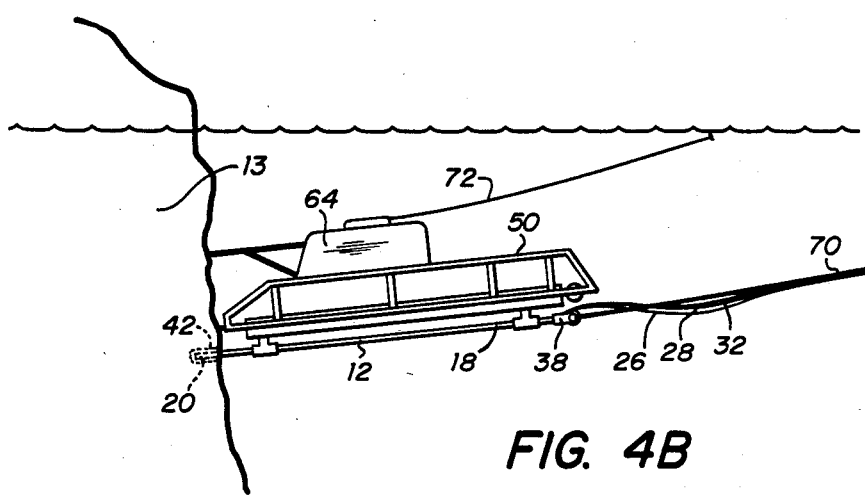
Figure 4C:
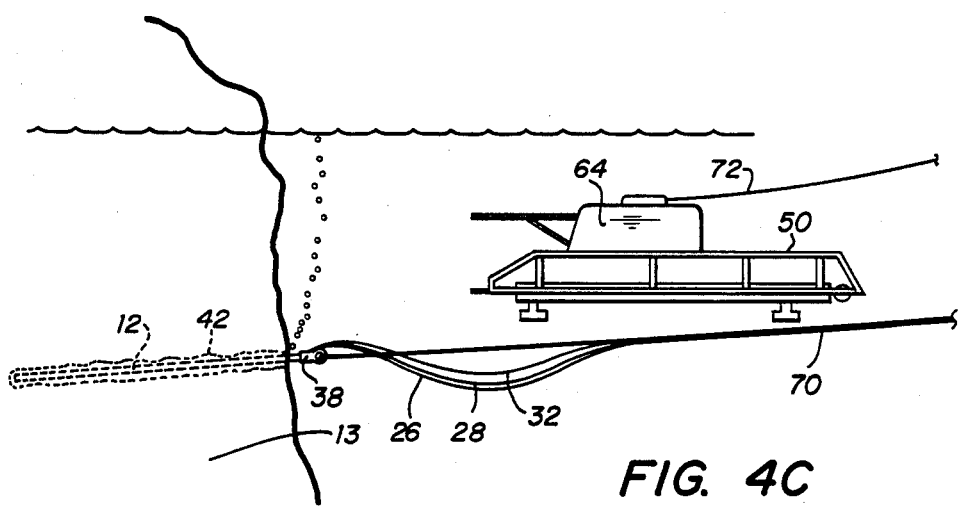

Referring now to FIGS. 4A through 4C, deployment of ice drill 12 and its use for an anchor for towing purposes are illustrated. In FIG. 4A remotely operated vehicle 64 approaches iceberg 13 with deployment sled mounted thereunder. Ice drill 12 is illustrated as mounted on deployment sled 50 having deployment end 18 with clevis 38 mounted to the rear of deployment sled 50 and drill head end 20 mounted towards the front of sled 50. A tow line 70 is attached to clevis 38 to provide a towing connection between ice drill 12 and a marine vessel (not shown). Water lines 26 and 28 and compressed fluid line 32 are connected to tow line 70 in a manner that allows all tension between clevis 38 and a marine vessel to be absorbed by tow line 70. A tether line 72 is attached to remotely operated vehicle 64 in the event of malfunction of the controls. In the event that remotely operated vehicle 64 malfunctions, the tether line 72 may be used to retrieve remotely operated vehicle 64 once ice drill 12 is in place.

FIG. 4B illustrates ice drill 12 as having initiated borehole 42. Ballast from ballast tanks 54A through 54D has been released to permit maintaining ice drill 12 in a generally horizontal plane. In FIG. 4C, ice drill 12 has been deployed and has drilled borehole 42. Ice drill 12 proceeded into iceberg 13 a predetermined distance such that clevis 38 extends out of the surface of iceberg 13. A compressed fluid is fed through fluid line 32 to expansion area 36 through nozzle 34 to provide quick freezing of external housing 14 of ice drill 12 into borehole 42. Remotely operated vehicle 64 together with deployment sled 50 is retrieved, leaving ice drill 12 having tow line 70 attached to clevis 38 solidly anchored into iceberg 13. In FIGS. 4A through 4C, ice drill 12 is illustrated as being deployed significantly below the surface of the water in which ice mass or iceberg 13 is floating. For best results, ice drill 12 is deployed in a horizontal plane on which the approximate center of gravity of iceberg 13 is located. Thus, iceberg 13 may be towed by exerting a pulling force on tow line 70 with a minimum amount of rolling and drag to provide additional safety and less stress on the towing vehicle.

Figure 5A:
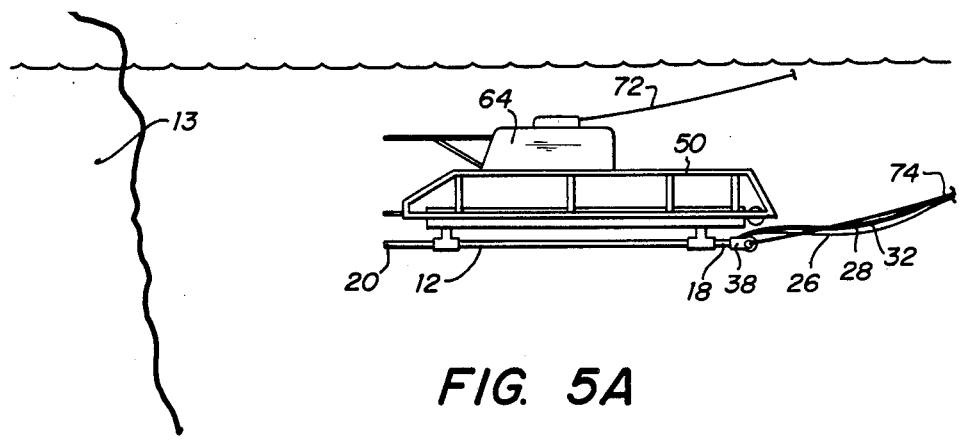
FIGS. 5A through 5C are plan views of an ice identification system.
Figure 5B:
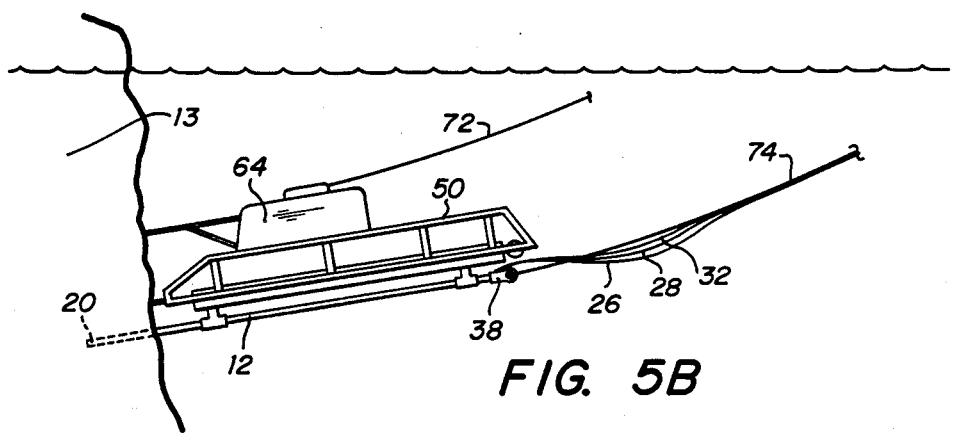
Figure 5C:
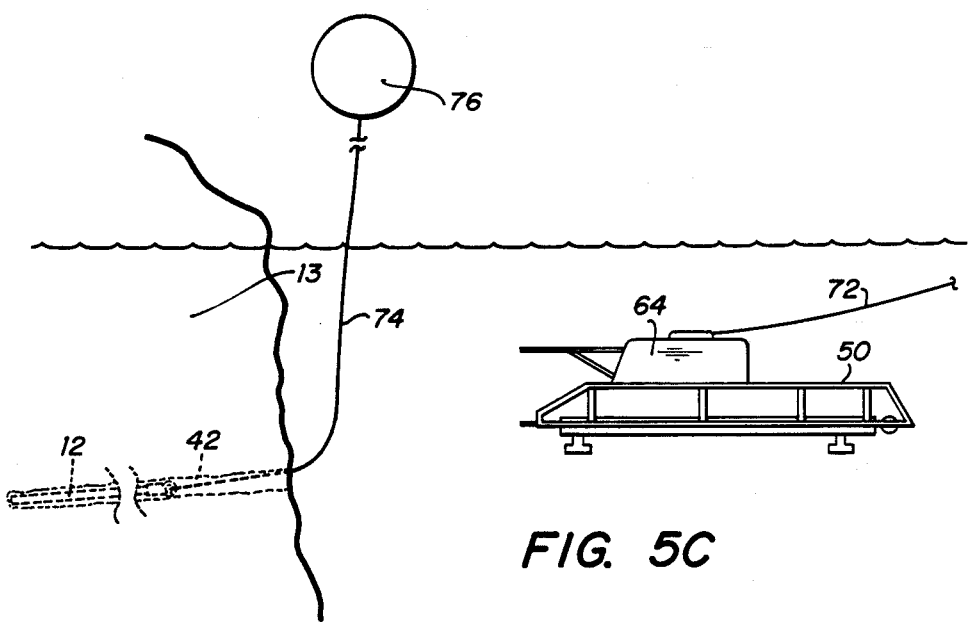

FIGS. 5A through 5C illustrate an iceberg identification system. FIG. 5A is similar to FIG. 4A differing only in the line attached to clevis 38. Line 74 attached to clevis 38 is preferably a much lighter nylon line attached to an identification balloon 76. Remotely operated vehicle 64 together with deployment sled 50 and ice drill 12 are operated much in the same manner for an ice identification system as for the ice towing system. However, clevis 38 is of a much smaller size to permit its entrance into borehole 42. Ice drill 12 is placed approximately 100 to 120 feet inside iceberg 13 to assure that line 74 remains attached to iceberg 13 despite a significant amount of melting over a period of several weeks.

Identification balloon 76 may either use an active or a passive identification system. In the active identification system, a transmitter (not shown) is attached to identification balloon 76 to continually transmit a signal, preferably in the radio frequency range. By assigning a distinct radio frequency to each of a plurality of icebergs, acurate monitoring of individual icebergs is possible.

For a passive identification balloon, balloon 76 may be coated with a metalic foil of a type which will reflect microwaves such as radar. Although iceberg 13 will not be apparent on a radar sweep of the area, balloon 76, when covered with a metallic foil, will provide a positive indication of the location of iceberg 13. If identification balloon 76 becomes detached from iceberg 13, detachment is determined by the height of balloon 76.

As illustrated in FIG. 5C, ice drill 12 has been deployed approximately 100 feet into iceberg 13 while identification balloon 76 remains attached to clevis 38 through line 74. As iceberg 13 travels through the water, it will be constantly melting. As indicated previously, the ice below the surface of the water and above the surface of the water will melt at different rates, depending on whether the air or water is warmer. As such, iceberg 13 will occassionally roll due to the uneven melting. Line 74 is provided with enough length to allow identification balloon 76 to remain above the surface of the water despite rolling and shifting of iceberg 13. Identification balloon 76 is preferably filled with a lighter than air gas such as hellium. By constructing identification balloon 76 in a manner similar to weather balloons, a useful life of several months is assured.

As illustrated in FIG. 5B, ice drill 12 may be deployed in iceberg 13 at any location whereas in FIGS. 4A through 4C, ice drill 12 must be deployed in approximately the same horizontal plane as the center of gravity of iceberg 13 for towing purposes.

Figure 6:
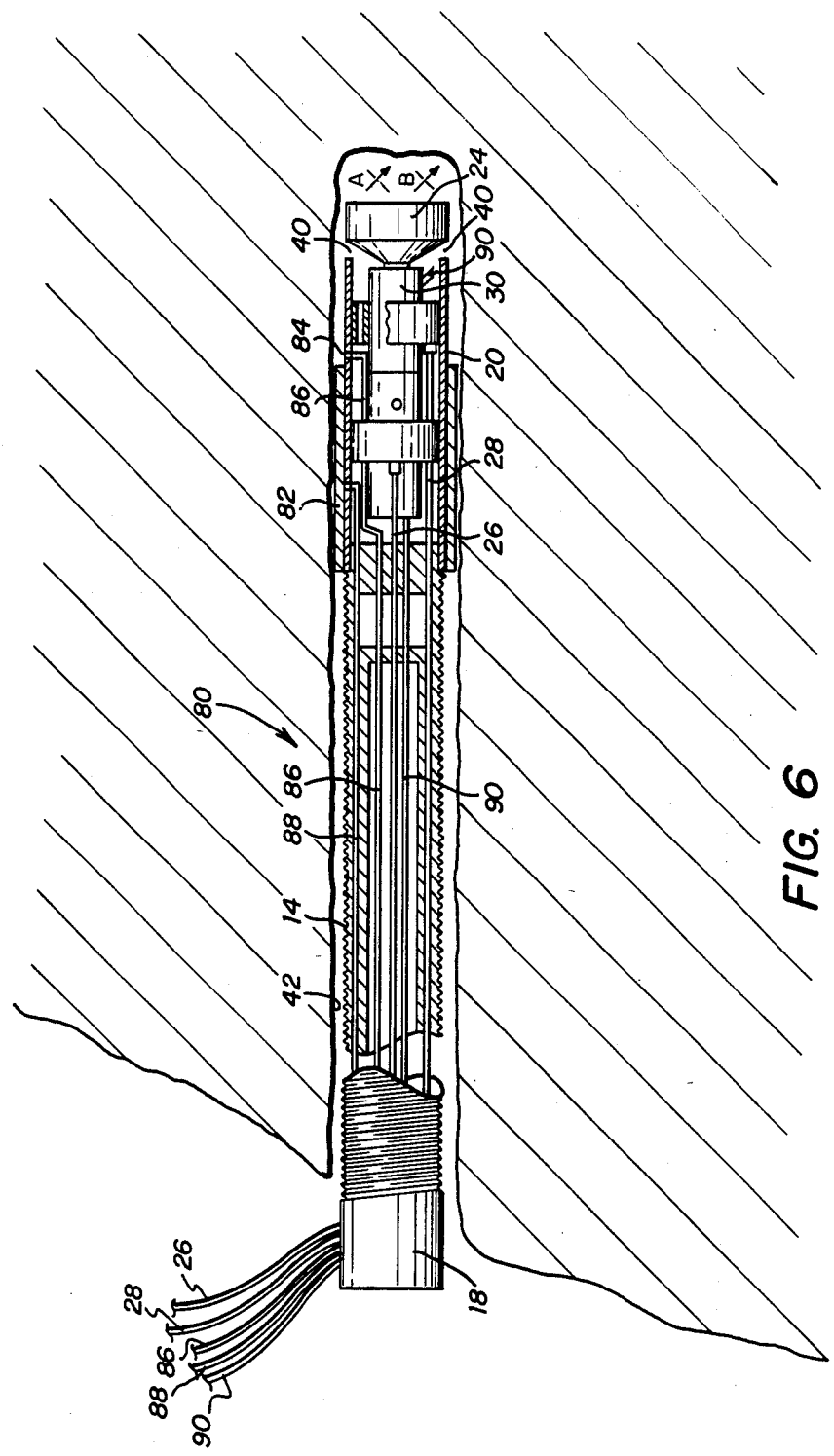
FIG. 6 is a plan view of an ice fracturing device.

Referring now to FIG. 6, a modified ice drill 80 is illustrated as being similar to ice drill 12 differing only insofar as external housing 14 contains a bore packer 82 mounted close to drill head end 20. Drill head end 20 contains a vertical drill nozzle 84 in addition to drill head 24. Five fluid lines instead of three lines are illustrated as feeding ice drill 80. In addition to water lines 26 providing fluid flow to drill head 24 and hydraulic fluid lines 28 to hydraulic motor 30, fluid line 86 is illustrated to provide fluid flow to vertical drill nozzle 84, fluid line 88 is illustrated to provide expansion fluid to bore packer 82 and a high pressure line 90 is illustrated to supply internal pressure in iceberg 13.

Figure 7:
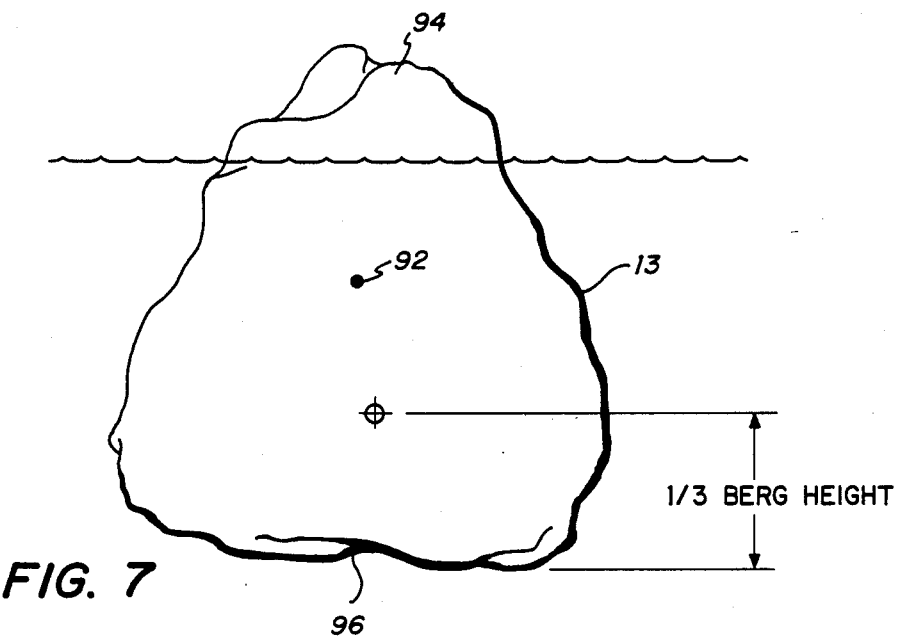
FIG. 7 is a plan view of an iceberg.

Referring now to FIG. 7, a plan view of iceberg 13 is illustrated. Iceberg 13 has its center of gravity 92 approximately half way between iceberg top 94 and iceberg bottom 96. In a system for splitting an iceberg, ice drill 80 must be deployed approximately one third of the height of iceberg 13 from bottom 96 in order to assure a simultaneous cracking above and below ice drill 80. This is due to the hydrostatic head of the water in which iceberg 13 is floating.

Figure 8A:
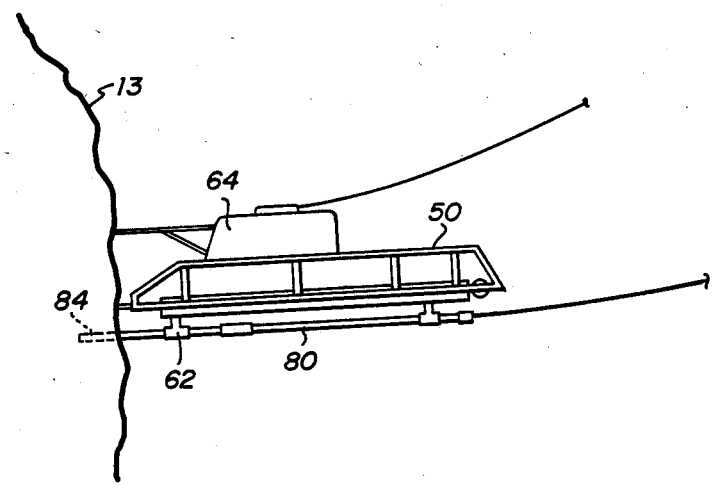
FIGS. 8A through 8C are plan views of the operation of the device of FIG. 6.
Figure 8B:
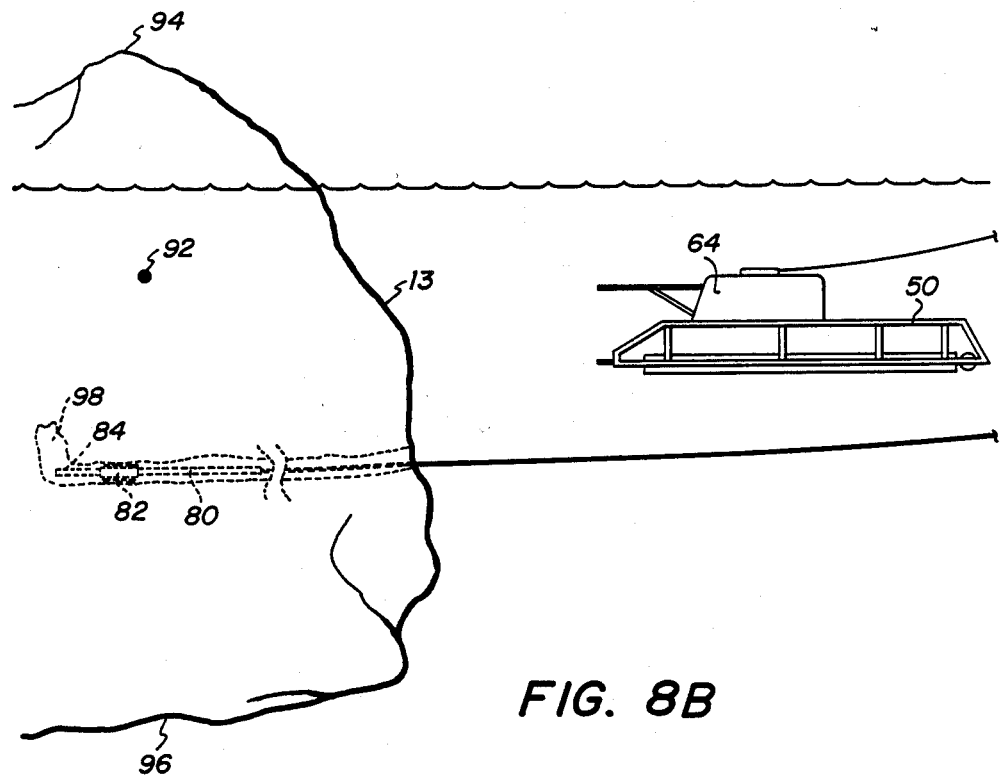
Figure 8C:
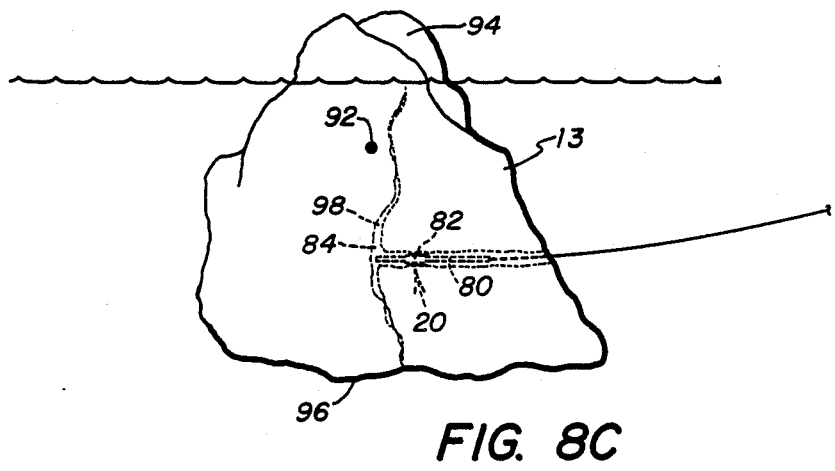

Referring now to FIGS. 8A through 8C, the deployment of an ice fracturing system is illustrated. Ice drill 80 is deployed into iceberg 13 to its approximate horizontal center at a predetermined depth, preferably two thirds of the distance from top 94 of iceberg 13. Upon reaching the approximate center of iceberg 13, fluid flow to drill head 24 is stopped and fluid flow to vertical drill nozzle 84 is begun to provide a vertical air space within iceberg 13. When a vertical area 98 is achieved, borepacker 82 is energized through fluid lines 88 to seal drill 80 into position. As illustrated in FIG. 8C, high pressure is provided through pressure line 90 to drill head end 20 of ice drill 80. This pressurizes vertical cavity 98 with air causing iceberg 13 to split. In the preferred embodiment, approximately 150 psig air pressure is used to cause iceberg 13 to fracture. Due to the hydrostatic head or external pressure of the water in which an iceberg 13 floats, fracturing will progress vertically upward approximately twice as rapidly as vertically downward. By initiating the fracture approximately one third of the distance from the bottom of iceberg 13, a fracture will reach top 94 and bottom 96 of iceberg 13 simultaneously, splitting iceberg 13 in two parts.

By fracturing a large iceberg, two smaller icebergs are produced which may easily be moved from a position where they endanger personnel and equipment by use of the ice towing system described previously.

The present invention illustrates a method and apparatus for drilling into an ice mass such as iceberg. In one example, a drill may be refrozen into position in the horizontal plane containing the center of gravity of the iceberg to permit towing the iceberg to a location where it no longer endangers personnel and equipment. In another example, a method and apparatus for identification of icebergs has been illustrated using an ice drill to provide a connection deep within an iceberg to provide a reliable monitoring system despite weather conditions. Additionally, a method and apparatus for providing a centralized area to internally pressurize an iceberg causing it to fracture has been illustrated. While the present invention has been described by way of preferred embodiment, it is to be understood that this was for illustration purposes only and that the present invention should not be limited thereto but only by the scope of the following claims.

What is claimed is:

1. A system for monitoring an iceberg comprising:
   an anchor means for providing an attachment point to the iceberg having
   an elongated hollow housing having a deployment end and a drill end;
   an annular drill head rotatably mounted on said drill end of said housing;
   a pressure means fixed to said drill head for providing pressurized fluid from said drill head to the iceberg, said pressure means including pressure jets mounted on said drill head;
   a movement means for advancing said elongated housing into the iceberg; and
   a freezing means for freezing said anchor means to said iceberg;
   a flotation means connected to said anchor means for providing a detachable housing associated with the iceberg; and
   an identification means attached to said flotation means for providing location identification for the iceberg.

2. The system according to claim 1 wherein said floatation means includes an inflatable member.

3. The system according to claim 2 wherein said identification means includes:
   a metallic structure for reflecting electromagnetic waves.

4. The system according to claim 2 wherein said identification means includes:
   a transmission means for providing an identifiable signal for determining the location of the iceberg.

5. The system according to claim 1 wherein said annular drill head includes:
   a plurality of passages therein for controlling fluid flow direction.

6. The system according to claim 5 wherein said pressure means includes:
   a conduit means traveling through said housing means for providing pressurized fluid to said pressure jets.

7. The system according to claim 6 wherein:
   said freezing means comprises a tubular means for providing cooling fluid for freezing said housing in place.

8. The system according to claim 7 wherein said tubular means includes:
   a cooling area extending from said deployment end to said drill end of said housing.

9. The system according to claim 8 wherein said cooling fluid is carbon dioxide.

10. The system according to claim 7 wherein said tubular means includes:
    a cooling tube wound within said housing.

11. A method for monitoring iceberg movement comprising the steps of:
    placing an anchor at a predetermined distance within the iceberg by drilling a hole into the iceberg through the use of pressurized fluid and freezing said anchor in said hole;
    attaching a flotation member to said anchor;
    connecting an identification member to said flotation member; and
    identifying the location of said iceberg through said identification member.

12. The method according to claim 11 wherein said identifying step includes the steps of:
    providing a metallic structure for reflecting electromagnetic signals as said identification member;
    transmitting said electromagnetic signals to said identification member; and
    receiving reflected electromagnetic signals from said identification member.

13. The method according to claim 11 wherein said identifying step includes the steps of:
    providing an electromagnetic signal transmitter as said identification member;
    transmitting an identifiable signal from said identification member; and
    receiving said identifiable signal to determine the location of the iceberg.

* * * * *